(12) United States Patent
Hatano et al.

(10) Patent No.: US 6,602,001 B1
(45) Date of Patent: Aug. 5, 2003

(54) REMOTE CONTROL SYSTEM AND REMOTE CONTROL TRANSMITTER FOR USE IN THE SAME

(75) Inventors: Yoichi Hatano, Fukui (JP); Noriaki Matsui, Fukui (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/317,558

(22) Filed: May 24, 1999

(30) Foreign Application Priority Data

May 25, 1998 (JP) .......................... 10-142684

(51) Int. Cl.[7] .............................................. H04B 10/00
(52) U.S. Cl. .................... 398/106; 398/107; 398/115; 340/825.22; 340/825.69; 340/825.72; 348/734
(58) Field of Search ................. 398/106, 107, 398/115; 340/825.22, 825.69, 825.72; 348/734

(56) References Cited

U.S. PATENT DOCUMENTS

| | | | |
|---|---|---|---|
| 4,626,848 A | 12/1986 | Ehlers | |
| 4,856,081 A | 8/1989 | Smith | |
| 4,999,622 A * | 3/1991 | Amano et al. | 340/825.72 |
| 5,028,919 A * | 7/1991 | Hidaka | 340/825.72 |
| 5,175,538 A * | 12/1992 | Kurita | 340/825.69 |
| 5,237,319 A * | 8/1993 | Hidaka et al. | 340/825.72 |
| 5,515,052 A | 5/1996 | Darbee | |
| 5,519,457 A * | 5/1996 | Nishigaki et al. | 348/734 |
| 5,812,293 A | 9/1998 | Yen | |
| 5,822,098 A | 10/1998 | Morgaine | |
| 6,021,319 A * | 2/2000 | Tigwell | 455/151.2 |
| 6,130,625 A * | 10/2000 | Harvey | 340/825.72 |
| 6,198,481 B1 * | 3/2001 | Urano et al. | 345/348 |
| 6,223,348 B1 * | 4/2001 | Hayes et al. | 348/734 |

* cited by examiner

*Primary Examiner*—Leslie Pascal
*Assistant Examiner*—Hanh Phan
(74) *Attorney, Agent, or Firm*—RatnerPrestia (57) ABSTRACT

A remote control system invention converts an infrared ray signal transmitted from an exclusive remote control transmitter of an electronic apparatus into a transmissive data by a signal analyzing/writing device, and writes the transmissive data in a nonvolatile memory, which is subsequently mounted on other remote control transmitter. A microcomputer in the remote control transmitter reads the transmissive data in the nonvolatile memory, and remote controls the electronic apparatus. Adoption of the present system enables a single unit of the remote control transmitter to remote control a plurality of electronic apparatuses by storing in the remote control transmitter transmissive data of different formats for the plurality of electronic apparatuses.

9 Claims, 6 Drawing Sheets

REMOTE CONTROL SYSTEM AND REMOTE CONTROL TRANSMITTER FOR USE IN THE SAME

FIELD OF THE INVENTION

The present invention relates to a system that handles data to be transmitted by an infrared remote control device for remote-controlling electronic apparatuses, and a remote control transmitter for use in the same.

BACKGROUND OF THE INVENTION

There are a great variety of conventional remote control transmitters (hereinafter referred to as "transmitter") now available. Among those, a kind of transmitter capable of remote-controlling a plurality of electronic apparatuses has come into wide use, such as a universal transmitter, a single unit of which can remote-control a television and a video tape recorder, for instance, manufactured by one company for its own brand name.

One example of the universal transmitter capable of remote-controlling a plurality of electronic apparatuses is a transmitter, which remotely controls a television and a video tape recorder equipped with a tuner. The transmitter is provided with operational keys for common use, having a function of controlling identical operations such as turning on and off, station selection, etc. In addition, the transmitter is so constructed that it generates an infrared ray signal in order to remotely control either of the television and the video tape recorder, when either one of them is selected by a separately provided TV/VTR selection switch.

A conventional universal transmitter of the kind mentioned above will now be described by referring to a circuit diagram.

Figure 6:
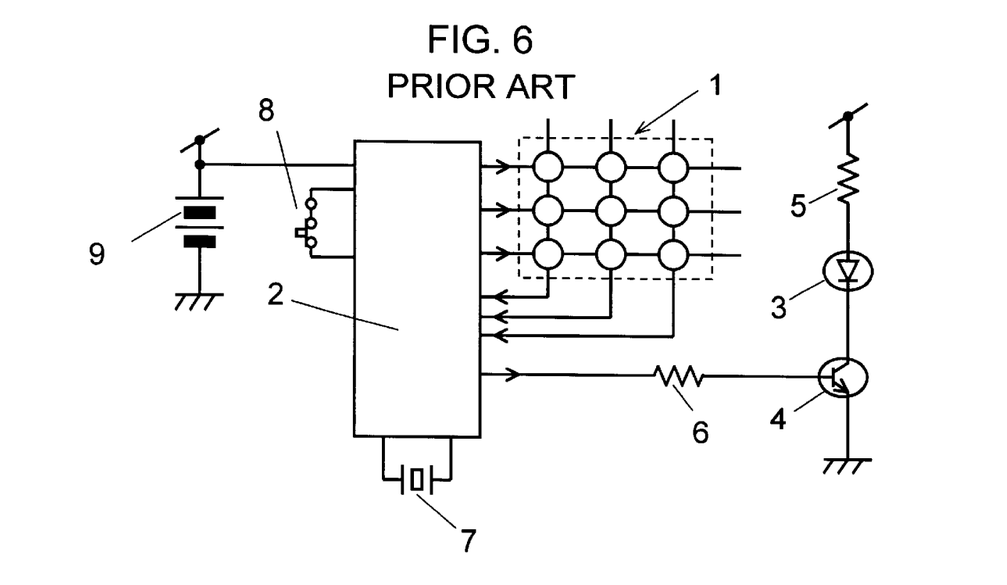
FIG. 6 is a circuit diagram of a universal remote control transmitter in accordance with the prior art.

FIG. 6 shows an essential portion of a circuit diagram of the conventional universal transmitter. Referring to the diagram, a reference numeral 1 represents a group of operational keys, a reference numeral 2 represents a microcomputer (hereinafter referred to as "MPU") having two combinations of transmissive data within an internal memory for remote-controlling a television and a video tape recorder, and a reference numeral 3 represents an infrared LED for transmitting a control signal output from the MPU 2 by converting it into an infrared ray signal. A reference numeral 4 represents a driving transistor for the infrared LED 3, a reference numeral 5 represents a current limiting resister connected in series with the infrared LED 3, and a reference numeral 6 represents a base resister for transferring the control signal of the MPU 2 to the driving transistor 4. Furthermore, a reference numeral 7 represents a ceramic oscillator for generating a reference signal, a reference numeral 8 represents a TV/VTR selection switch for selecting the data to be transmitted, and a reference numeral 9 represents a battery for supplying electric power to all the components.

Described below is an operation of the foregoing conventional universal transmitter.

When controlling a television, the TV/VTR selection switch 8 is shifted to a TV position first, and any one of the operational keys 1 is depressed. This causes the ceramic oscillator 7 to generates a reference signal, and the MPU 2 to operate at the same time for generating a control signal corresponding to the depressed key among the group of operational keys 1.

The control signal sent from the MPU 2 is input to the driving transistor 4 via the base resister 6, and amplified for driving the infrared LED 3 to blink, so as to control operation of the television.

Or, a video tape recorder can be controlled in the same manner as the above by shifting the TV/VTR selection switch 8 to a VTR position, in the case of operating the video tape recorder. In this way, both of the television and the video tape recorder can be remote-controlled with a single unit of the universal transmitter.

In the case of using the foregoing universal transmitter of the prior art for remote-controlling electronic apparatuses, however, there are often cases in that the transmissive data stored in the MPU 2 do not correspond with control data of a replaced or added electronic apparatus, if at least either one of the television and the video tape recorder being controlled is replaced with another product of a different manufacturer, or a new electronic apparatus is added. In such instances, the conventional universal transmitter becomes incapable of remote-controlling the replaced television or video tape recorder, or the additional electronic apparatus.

SUMMARY OF THE INVENTION

A remote control system of the present invention comprises a remote control signal analyzing/writing device, and a remote control transmitter. The remote control signal analyzing/writing device further comprises:

(a) a light receiving unit for receiving an infrared-ray signal adapted to remote-control an electronic apparatus, and converting it into an electric signal;

(b) an analyzing unit for analyzing the electric signal output by the light receiving unit, and converting it into a transmissive remote control data suitable for remote-controlling the electronic apparatus;

(c) a first microcomputer for controlling an operation of the entire device, and for writing the transmissive remote control data in a removable first nonvolatile memory; and (d) a first electrical connector for receiving the removable first nonvolatile memory which receives an output data of the first microcomputer.

Also, the remote control transmitter further comprises:

(a) a second electrical connector for removably receiving the first nonvolatile memory;

(b) a second microcomputer for reading the transmissive remote control data from the first nonvolatile memory;

(c) an infrared-ray signal output unit for generating an infrared ray signal in response to an output of the second microcomputer; and (d) a plurality of operational keys corresponding to remote control operations of the electronic apparatus.

With the foregoing system of the present invention, the transmitter is able to include the transmissive data for remote-controlling a replaced or a newly added electronic apparatus in addition to the originally stored data. As a result, the system makes a single unit of the transmitter capable of remote-controlling many electronic apparatuses.

DESCRIPTION OF THE PREFERRED EMBODIMENTS

Preferred embodiments of the present invention will be described hereinafter by referring to the accompanied drawings.

First Exemplary Embodiment

Figure 1:
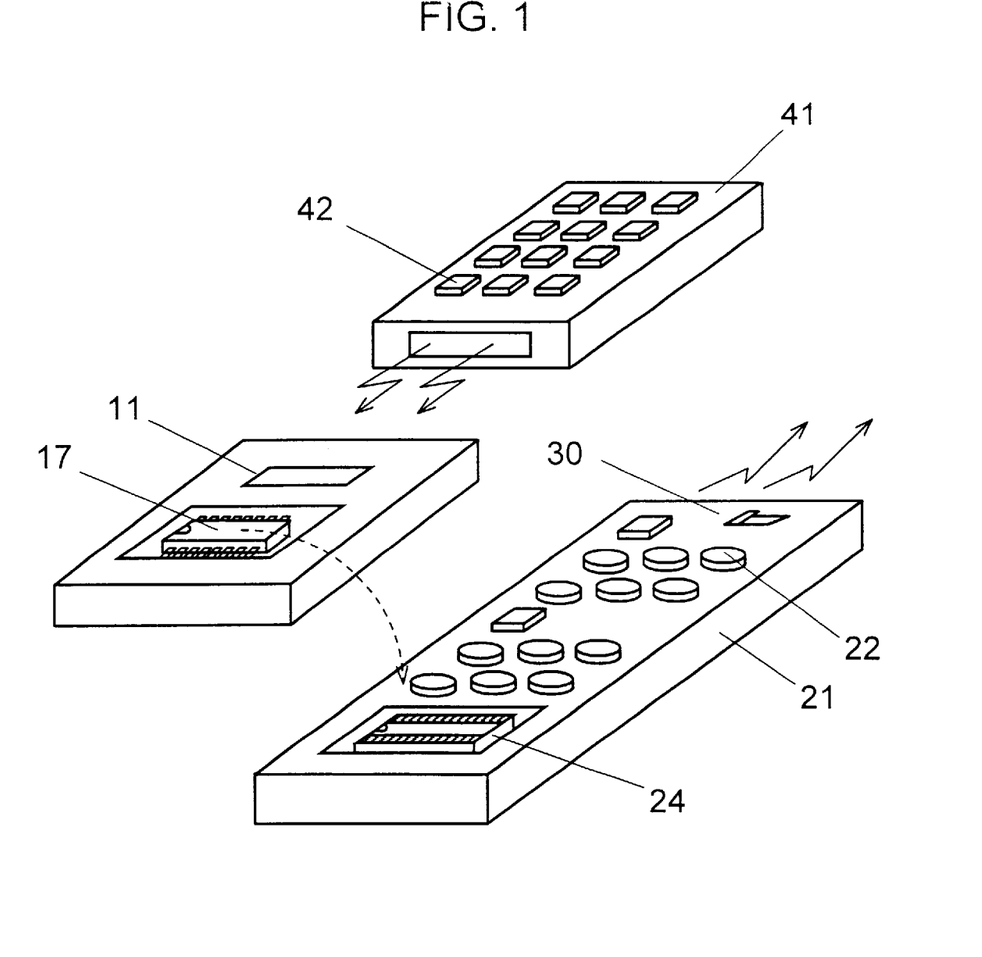
FIG. 1 is a schematic drawing depicting an infrared remote control system of a first exemplary embodiment of the present invention.

FIG. 1 depicts a schematic drawing of a remote control system in accordance with a first exemplary embodiment of the present invention. Referring to FIG. 1, a reference numeral 11 represents a remote control signal analyzing/writing device, a reference numeral 21 represents a transmitter adapted to this system, and a reference numeral 41 represents an exclusive transmitter supplied with an electronic apparatus.

Figure 2:
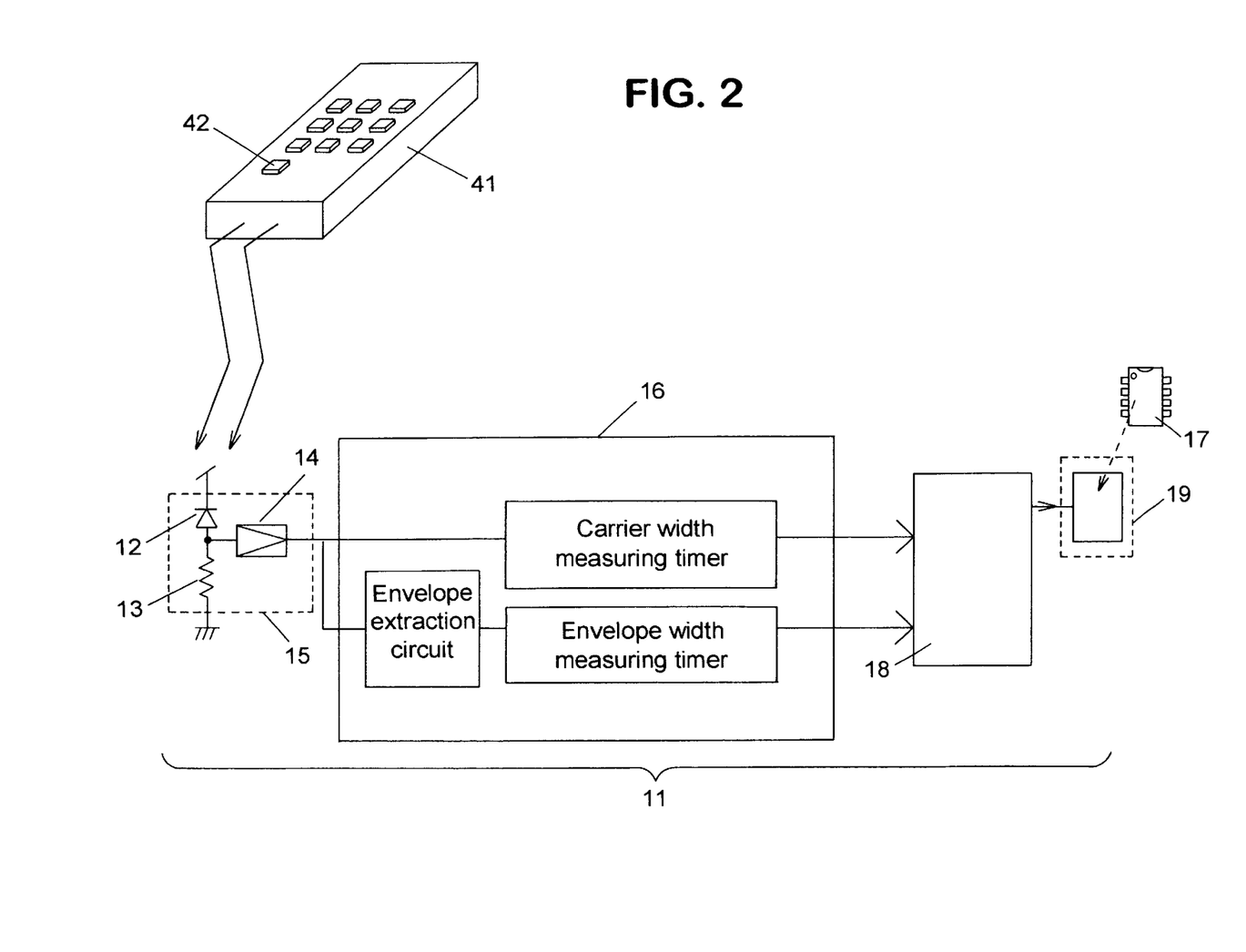
FIG. 2 is a schematic drawing depicting a writing operation of a transmissive data into a nonvolatile memory with a remote control signal analyzing/writing device in accordance with the first exemplary embodiment of the present invention.

A writing operation of a transmissive data into a nonvolatile memory according to the present exemplary embodiment will be described by referring to FIG. 2. The remote control signal analyzing/writing device 11 comprises; (1) a light receiving unit 15 comprising a PIN photodiode 12, a resister 13, an amplifier 14, and the like components for receiving an infrared ray signal and converting it into an electric signal, (2) an analyzing circuit 16 comprising an IC, fore example, for analyzing the electric signal output from the light receiving unit 15 and converting it into a transmissive remote control data suitable for remote-controlling the electronic apparatus, (3) a first microcomputer (hereinafter referred to as "first MPU") 18 for controlling an operation of the entire device 11, as well as writing the remote control data produced by the analyzing circuit 16 into a first nonvolatile memory 17, and (4) a first memory socket 19 connected to the first MPU 18 for receiving the first nonvolatile memory 17 removably from an outside of the device, as shown in FIG. 2.

Figure 3:
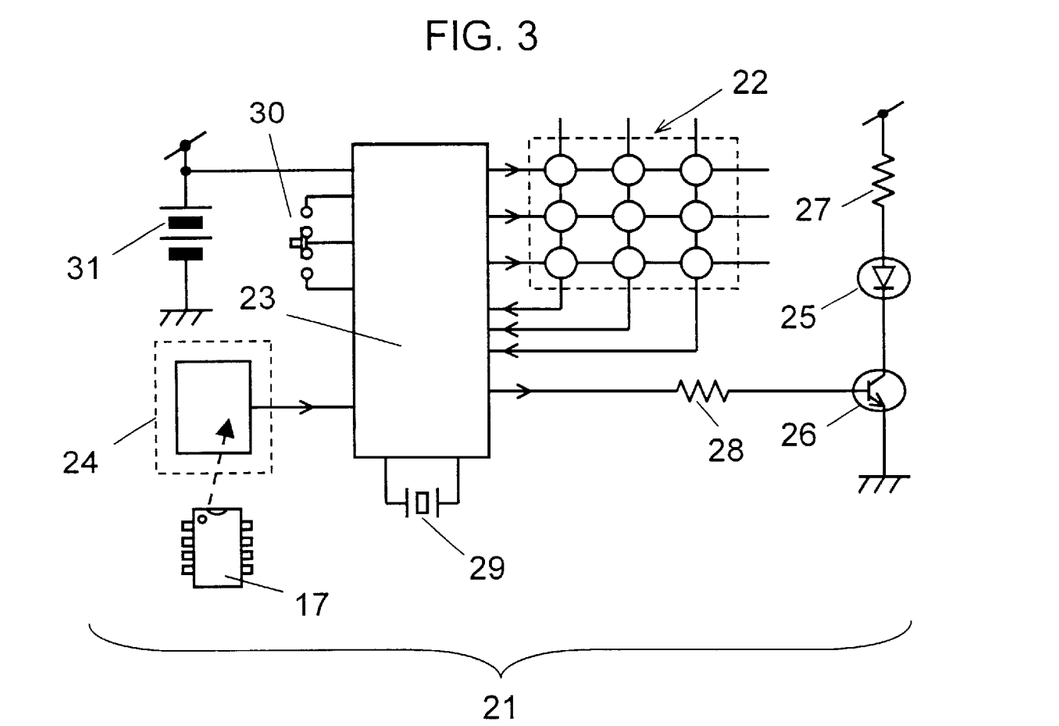
FIG. 3 is a circuit diagram of a transmitter in accordance with the first exemplary embodiment of the present invention.

Also, as depicted in the circuit diagram of FIG. 3, a transmitter 21 adapted to be used for the present system comprises;

(1) a plurality of operational keys 22 having functions such as turning on and off, station-selection, etc., (2) a second microcomputer (hereinafter referred to as "second MPU") 23 storing at least two combinations of transmissive data for remote-controlling a television, a video tape recorder, etc. of a same manufacturer, and for controlling an operation of the entire transmitter, (3) a second memory socket 24 for removably receiving the first nonvolatile memory 17 from an outside, and connected to the second MPU 23, (4) an infrared LED 25 for transmitting a control signal output from the second MPU 23 by converting it into an infrared ray signal, (5) a driving transistor 26 for the infrared LED 25, (6) a current limiting resistor 27 connected in series with the infrared LED 25, (7) a base resistor 28 for transferring the control signal output from the second MPU 23 to the driving transistor 26, (8) a ceramic oscillator 29 for generating a reference signal, (9) a selection switch 30 for selecting a transmissive remote control data to be read from the second MPU 23 in order to choose an operation among TV, VTR, AUX, etc., and (10) a battery 31 for supplying electric power to all of the above components.

The remote control system constructed as above operates in a manner, which will be described hereinafter. The following operation is an example, in which a user previously been using a television and a video tape recorder of the same manufacturer, which the user had been using with a single unit of the remote control transmitter 21, and the user replaces the television with another television made by a different manufacturer.

First, a first nonvolatile memory 17, which had been mounted originally in the remote control transmitter 21, is connected to a first memory socket 19 provided in a remote control signal analyzing/writing device 11 at a retail store or a service shop who carries the remote control signal analyzing/writing device 11 of this exemplary embodiment. When one of the operational keys 42 on the exclusive transmitter 41 supplied with the new (i.e. replacement) television is depressed, the exclusive transmitter 41 transmits an infrared ray signal. A PIN photodiode 12 provided in a light receiving unit 15 of the remote control signal analyzing/writing device 11 receives the infrared ray signal and converts it into an electric signal. An amplifier 14 amplifies the electric signal, and output it to an analyzing circuit 16. Although the foregoing instance has referred to the first nonvolatile memory 17 mounted originally in the transmitter 21, a separately prepared nonvolatile memory may be used for the same purpose.

Figure 7:
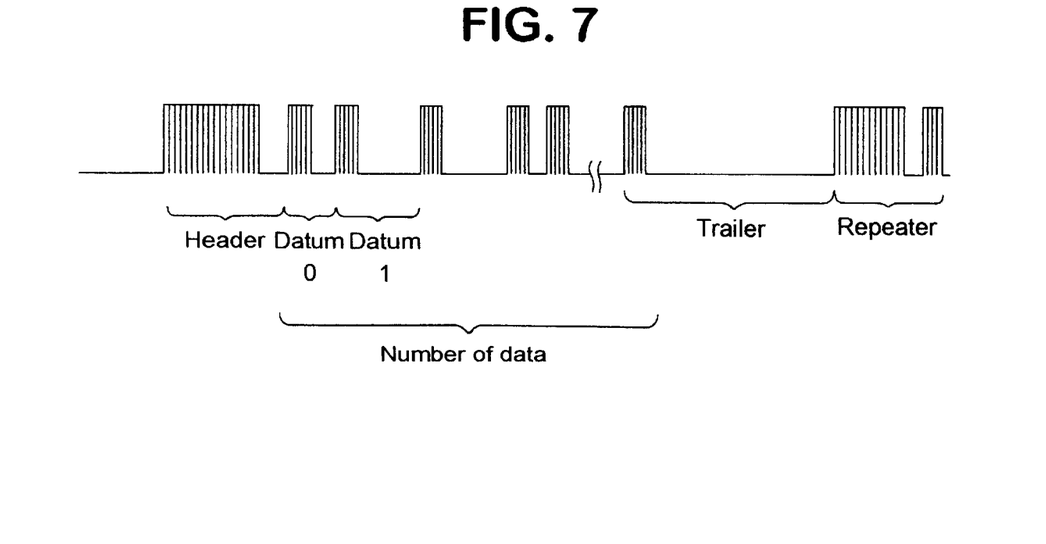
FIG. 7 illustrates exemplary remote controlling formats.

MPU 18 reads the carrier width, detects the existence of a header, and analyzes the header pulse width, datum width, and number of data elements. The remote controlling formats as shown in FIG. 7 of the individual manufacturer are defined in a ROM in the MPU 18 in advance.

MPU 18 identifies the manufacturer by comparing an output signal from an analyzing circuit 16 with the specific format in a ROM in MPU 18. MPU 18 also reads the "0" and "1" data of the remote control formats for each key and stores them in a RAM in the MPU 18.

As described above, MPU 18 identifies the format of the manufacturer and stores the code data for every key into a RAM in the MPU 18. MPU 18 then stores and codes data into the first nonvolatile memory 17.

Following the above, the depressing manipulation is repeated one by one for each of the operational keys 42 of the exclusive transmitter 41, so as to write in the first nonvolatile memory 17 all of the transmission remote control data desirable for remote-controlling the new television in order to complete a storage of the transmission data.

Then, the first nonvolatile memory 17 is removed from the memory socket 19 provided in the signal analyzing/writing device 11 and is put into a memory socket 24 provided in a remote control transmitter 21, as shown in FIG. 3.

The remote control transmitter 21 is then powered on, and a program in the second MPU 23 provided in a remote control transmitter 21 starts. The second MPU 23 reads a series of data stored in the first nonvolatile memory 17. With this reading, the second MPU 23 knows whether the first nonvolatile memory 17 is connected.

After recognition of the connection of the first nonvolatile memory 17, the second MPU 23 reads the format data and the code data for each key from the first nonvolatile memory 17 and stores them into a RAM in the second MPU 23. The remote control transmitter 21 operates in a manner as described hereinafter. When a selection switch 30 of the remote control transmitter 21 is set to a newly established television position, a depressing manipulation of the operational key 22 causes the second MPU 23 to output the format data and the key code data which is read from the nonvolatile memory 17 and stored in the RAM in the second MPU 23. The second MPU 23 thus allows an infrared LED 25, through a driving transistor 26, to transmit an infrared ray signal for remote-controlling the television.

Also, if the selection switch 30 is set to a position for the video tape recorder theretofore in use, an infrared ray signal is transmitted based on the transmissive remote control data stored originally in the second MPU 23 for remote-controlling the video tape recorder.

As has been described, the remote control signal analyzing/writing device 11 of the present exemplary embodiment is able to readily write transmissive remote control data necessary for remote-controlling an electronic apparatus in the first nonvolatile memory 17, when the electronic apparatus is replaced. The remote control transmitter 21 becomes capable of remote-controlling the new electronic apparatus, in addition to other apparatuses theretofore in use, by mounting the first nonvolatile memory 17 on it. As a result, a variety of electronic apparatuses made by a plurality of manufacturers using different formats of transmissive data can be remote-controlled by one transmitter. Furthermore, the user can write new transmissive data corresponding to new electronic apparatuses repeatedly within a storage capacity of the first nonvolatile memory 17 by removing the memory 17 from the second memory socket of the remote control transmitter 21, if he/she desires to remote-control the new additions of different apparatuses.

An example for reading out a remote controlling format and remote controlling data from the first nonvolatile memory 17 will be described hereinafter.

Figure 8:
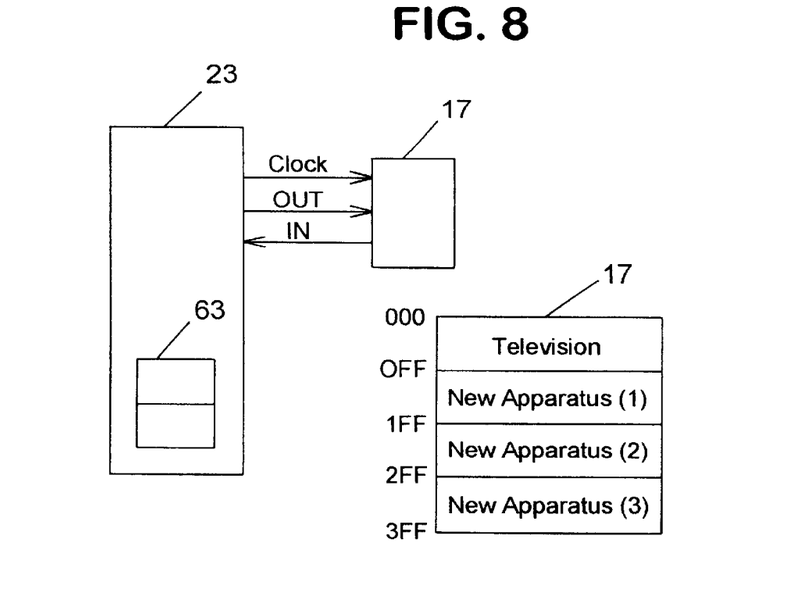
FIG. 8 illustrates the use of nonvolatile memory.

As shown in FIG. 8, space within the first nonvolatile memory 17 may optionally be divided into fourths, and a series of controlling data for original television set are stored in address "OFF". The data for new apparatus 1 are stored in address "1FF", the data for new apparatus 2 in address "2FF", the data for new apparatus 3 in address "3FF", respectively.

When the transmitter is powered on, the second MPU 23 reads data and stores them in a RAM in the second MPU 23. If a selection switch is set to "television", the second MPU 23 reads a series of controlling data for television set, and a remote controlling signal according to the specific key are transmitted.

An example for practical use for selecting a new apparatus is explained hereinafter.

In the case of the transmitter 21 have a 2 channel (television and video tape recorder, for example) selector switch and a "Set" key, an example of the selecting action is as follows.

A numerical "1" key is depressed a long with depressing of the "Power" key for the television set. The "Set" key is depressed. By this action, a new apparatus (1) is selected. In the same way, a new apparatus (2) is selected by depressing the "Power" key, "2" key and "Set" key. Also, a new apparatus (3) is selected by depressing the "Power" key, "3" key and "Set" key.

In the case of the transmitter 21 having a 3 channel (television, video tape recorder and AUX, for example) selector switch, a new controlling signal is stored in a corresponding addresses in RAM in the second MPU 23 and the third apparatus is selected by depressing the "AUX" key.

From the foregoing, it is considered to be desirable that the remote control signal analyzing/writing device of this exemplary embodiment be equipped by retail stores of electronic apparatuses and manufacturer's service shops. These stores can utilize the remote control signal analyzing/writing device for writing transmissive remote control data corresponding to new electronic apparatuses in a remote control transmitter already in use, upon request of a customer who purchases the new apparatuses.

Although what has been described is the remote control signal analyzing/writing device 11 comprising the analyzing circuit 16 composed of one complete circuit block, the signal analyzing/writing device can be made readily and less expensively by providing the first MPU 18 with means (a software program, etc.) having a similar function as the analyzing circuit 16. Further, although a socket is referred to as means for removably connecting the nonvolatile memory in the present exemplary embodiment, removable connection means other than the above are available and useable, such as a resilient connecting material having anisotropic conductivity, a conductive adhesive, and the like materials.

Second Exemplary Embodiment

Figure 4:
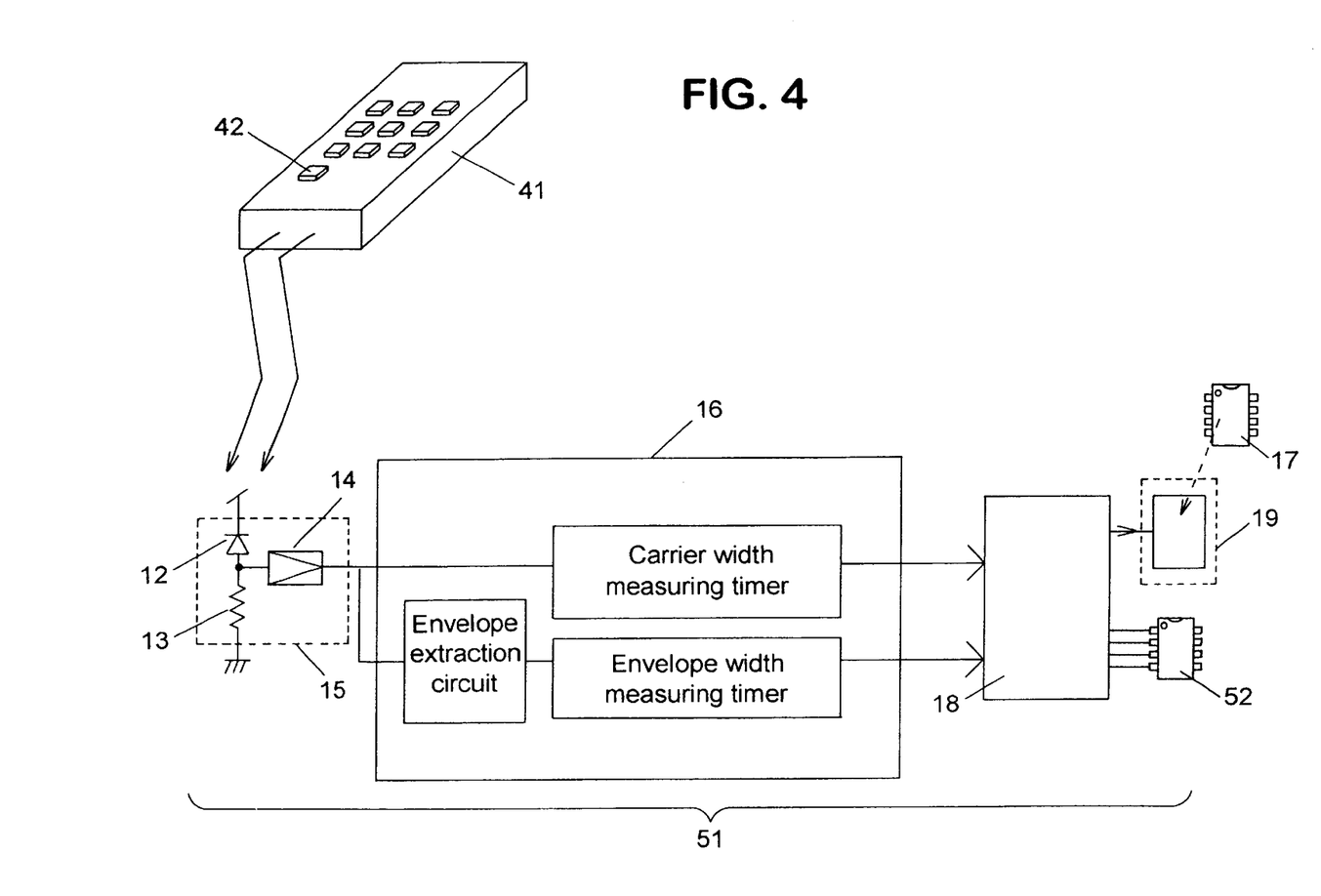
FIG. 4 is a schematic drawing depicting a writing operation of a transmissive data into a nonvolatile memory by using a remote control signal analyzing/writing device of a remote control system in accordance with a second exemplary embodiment of the present invention.

FIG. 4 is a schematic drawing depicting a writing operation of a transmissive remote control data into a nonvolatile memory by using a remote control signal analyzing/writing device 51 of a remote control system in a second exemplary embodiment of the present invention. The remote control signal analyzing/writing device 51 of the present embodiment is provided with a second nonvolatile memory 52 connected to a first MPU 18, in addition to the same device of the first exemplary embodiment.

The second nonvolatile memory 52 is written and stored in advance with transmissive remote control data for remote-controlling a number of electronic apparatuses made by major manufacturers. And the first MPU 18 is stored additionally with a program for reading a desirable transmissive remote control data from the second nonvolatile memory 52.

An operation of the remote control signal analyzing/writing device 51 constituted as above will be described hereinafter. When at least any one of the operational keys 42 is depressed on the exclusive remote control transmitter 41 supplied with the new electronic apparatus described in the first exemplary embodiment, an infrared ray signal is transmitted. In the same manner as the first exemplary embodiment, the light receiving unit 15 of the remote control signal analyzing/writing device 51 converts the infrared ray signal into an electrical signal, and the analyzing circuit 16 inputs it to the first MPU 18 after converting it into a transmissive remote control data. The first MPU 18 then compares the transmissive remote control data with a transmissive remote control data stored in the second nonvolatile memory 52. If there is any identical data in the second nonvolatile memory 52, the first MPU 18 reads from the second nonvolatile memory 52 and stores in the first nonvolatile memory 17 mounted on the first memory socket 19 all of the data that are identical to the transmissive remote control data contained in the exclusive remote control transmitter 41.

Thus, the remote control transmitter 21 becomes capable of remote-controlling the new (i.e. replacement) electronic apparatus in addition to the apparatus theretofore in use, in the same way as the first exemplary embodiment, by removing the first nonvolatile memory 17 from the first memory socket 19, and mounting it on the second memory socket 24 provided in the remote control transmitter 21, as shown in FIG. 3. Accordingly, the invention can make the remote control transmitter 21 capable of remote-controlling a variety of electronic apparatuses made by a plurality of manufacturers using different formats of transmissive data.

In the present exemplary embodiment, the same process as described in the first exemplary embodiment is to be executed in order to write and store all of transmissive remote control data contained in the exclusive remote control transmitter 41, in the case that a transmissive remote control data input to the first MPU 18 does not correspond with any of the transmissive remote control data stored in the second nonvolatile memory 52.

With the present exemplary embodiment, the remote control signal analyzing/writing device 51 is able to read all of the necessary transmissive remote control data from the second nonvolatile memory 52 by depressing only one operational key of the exclusive remote control transmitter 41, thereby reducing a working time required for writing the transmissive remote control data into the first nonvolatile memory 17. Furthermore, it has a remarkable advantage of avoiding an inadvertent omission in writing the required data.

Third Exemplary Embodiment

Figure 5:
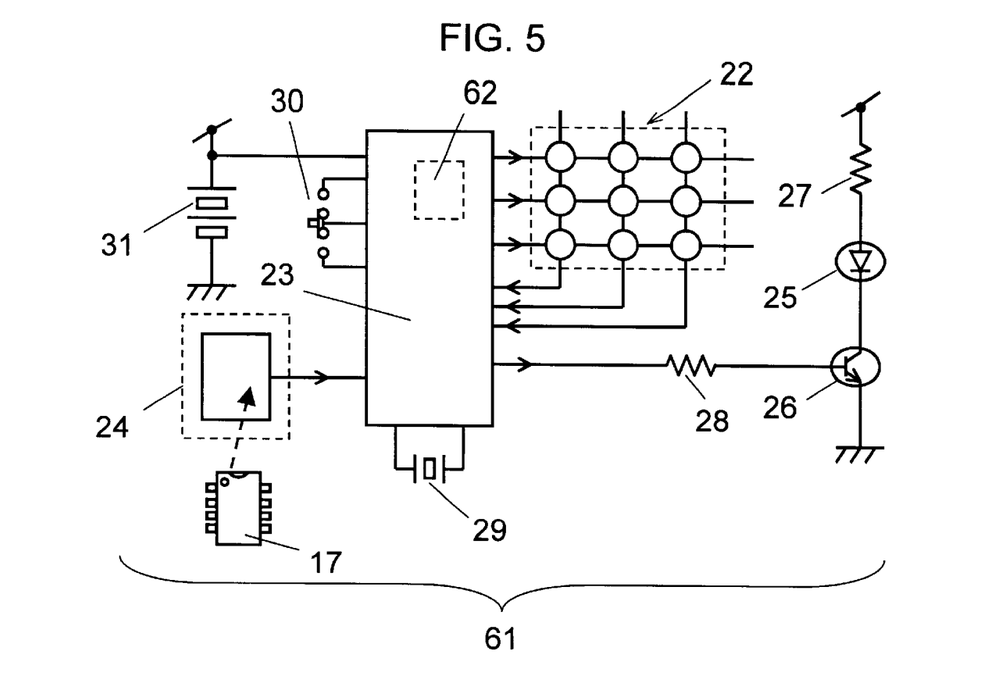
FIG. 5 is a circuit diagram of a transmitter of a remote control system in accordance with a third exemplary embodiment of the present invention.

FIG. 5 depicts a circuit diagram of a remote control transmitter 61 utilized for a remote control system in accordance with a third exemplary embodiment of the present invention. A second MPU 23 in the transmitter 61 of the present exemplary embodiment contains an internal nonvolatile memory 62. The second MPU 23 is provided with a program for reading a transmissive data stored in the first nonvolatile memory 17 mounted on the second memory socket 24, and storing it in the internal nonvolatile memory 62.

Therefore, a function of the transmitter 61 is to have the second MPU 23 read a transmissive data from the first nonvolatile memory 17, and store it in the internal nonvolatile memory 62, when the first nonvolatile memory 17 containing the transmissive data for a new electronic apparatus is mounted on the second memory socket 24. Then, the transmitter 61 is able to remote-control the electronic apparatus, in the same manner as the foregoing transmitter described in the first exemplary embodiment, even after the first nonvolatile memory 17 is removed from the second memory socket 24.

By virtue of this exemplary embodiment, the transmitter 61 is not required to keep the first nonvolatile memory 17 mounted while using it, so that the one possessed by a retail store, etc. may be used only when writing the transmissive remote control data of the new electronic apparatus. This can make the transmitter 61 less expensive.

As has been described, the transmitter of the present invention for remote-controlling electronic apparatuses is mounted with a removable nonvolatile memory, so that a transmissive remote control data suitable for remote-controlling a new electronic apparatus is readily writable in the nonvolatile memory. The invention thus achieves an advantageous effect that a plurality of electronic apparatuses in various kinds made by different manufacturers using different formats of transmissive data can be remote-controlled with a single unit of the remote control transmitter within an available capacity of the nonvolatile memory.

Furthermore, another exemplary embodiment of the present invention can substantially reduce a time required for the foregoing writing process, thereby making it convenient for the user. A still another exemplary embodiment of the present invention can achieve not only a substantial reduction in the writing time, but also a reduction in cost of the transmitter.

What is claimed is:

1. A remote control system comprising:
   a remote control signal analyzing/writing device including:
      (a) a signal receiving unit;
      (b) analyzing means for analyzing an electric signal output from said signal receiving unit, and for converting said electric signal into transmissive remote control data;
      (c) a first memory socket for removably receiving a first nonvolatile memory, and
      (d) a processing means for writing output data corresponding to said transmissive remote control data to said first nonvolatile memory;
   a remote control transmitter including:
      (a) second memory socket for removably receiving said first nonvolatile memory; and
      (b) means for outputting a further signal corresponding to output data received through said second memory socket,
   wherein said output data corresponding to said transmissive remote control data written in said first nonvolatile memory is sent from said remote control transmitter when said first nonvolatile memory is connected to said second memory socket and said remote control transmitter is operated.

2. The remote control system of claim 1, wherein said signal receiving unit is a light receiving unit for receiving light.

3. The remote control system of claim 2, further comprising a first microcomputer for providing said output data responsive to said transmissive remote control data.

4. The remote control system according to claim 3, wherein a second microcomputer in said remote control transmitter is provided therein with a nonvolatile memory for storing the transmissive remote control data contained in said first nonvolatile memory.

5. The remote control system according to claim 3, wherein said analyzing means for converting the electric signal output from said light receiving unit into said transmissive remote control data is contained within said first microcomputer.

6. The remote control system according to claim 4, further comprising a second microcomputer which is coupled to a second nonvolatile memory in which transmissive remote control data is stored.

7. The remote control system according to claim 5, wherein said second nonvolatile memory is prestored in advance with transmissive remote control data suitable for remote-controlling a plurality of electronic apparatuses.

8. The remote control system according to claim 6, wherein said first microcomputer performs a comparison of a part of transmissive remote control data received and converted by said light receiving unit with transmissive remote control data stored in said second nonvolatile memory, reads transmissive remote control data from said second nonvolatile memory responsive to said comparison providing a positive result, and stores in said first nonvolatile memory said transmissive remote control data read from said second nonvolatile memory.

9. The remote control system according to claim 4, wherein a second microcomputer in said remote control transmitter is provided therein with a nonvolatile memory for storing the transmissive remote control data contained in said first nonvolatile memory.

* * * * *